2 Sheets—Sheet 1.

J. F. WINCHELL.
Force-Feed for Grain-Drills.

No. 201,079.  Patented March 5, 1878.

Witnesses:
Donn J. Twitchell.
Will N. Dodge.

Inventor:
James F. Winchell,
by Dodge & Son
Atty.

2 Sheets—Sheet 2.

J. F. WINCHELL.
Force-Feed for Grain-Drills.

No. 201,079. Patented March 5, 1878.

Witnesses:
Dorn J. Twitchell.
Will N. Dodge.

Inventor:
James F. Winchell
by Dodge & Son
Attys.

UNITED STATES PATENT OFFICE

JAMES F. WINCHELL, OF SPRINGFIELD, OHIO.

IMPROVEMENT IN FORCE-FEED FOR GRAIN-DRILLS.

Specification forming part of Letters Patent No. 201,079, dated March 5, 1878; application filed January 10, 1878.

*To all whom it may concern:*

Be it known that I, JAMES F. WINCHELL, of Springfield, in the county of Clark and State of Ohio, have invented certain Improvements in Force-Feed for Grain-Drills, of which the following is a specification:

This invention relates to that class of feeding devices which consist of a cup or case, a vertical wheel delivering the grain in a continuous stream through the cup, and a gate arranged to vary the discharge without changing the speed of the wheel; and the improvement consists in hanging the regulating-gate on an axis concentric with that of the feed-wheel, by preference on the feed-wheel shaft; and also in the form of the gate and manner of imparting motion thereto.

Figure 1:
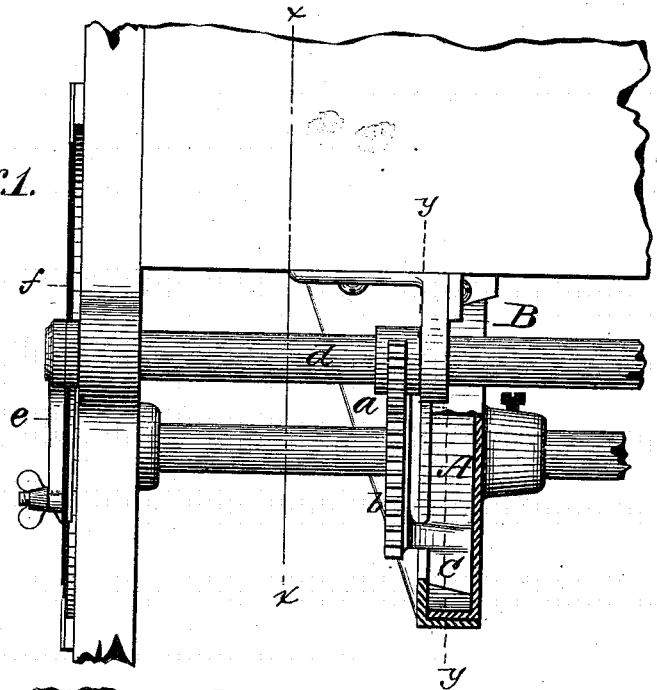
Figure 2:
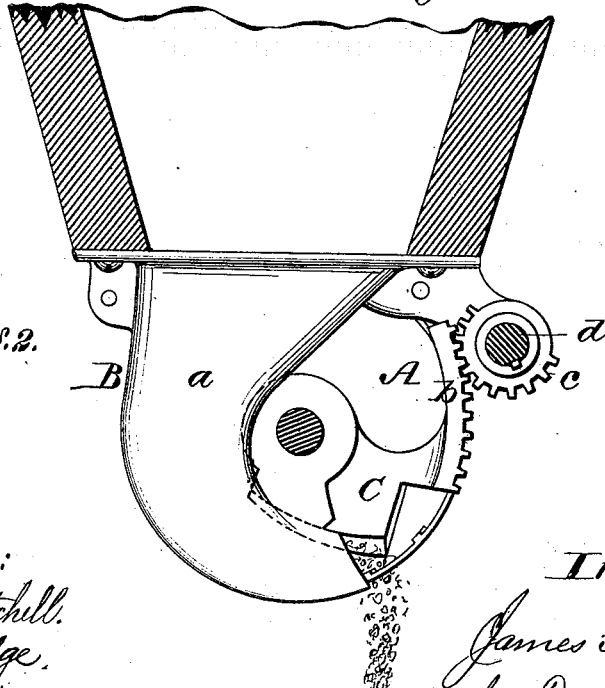
Figure 3:
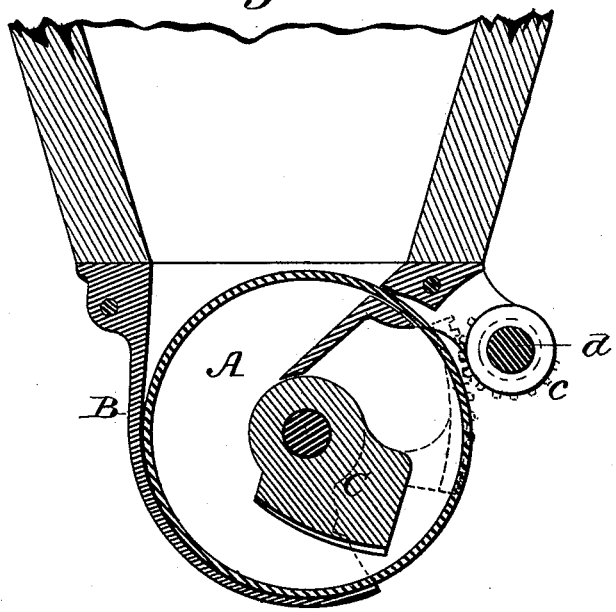

Figure 1 represents a rear elevation of my improved feeder with the feed-wheel broken away, as indicated by the dotted line in Fig. 2, to expose the gate; Fig. 2, a sectional view of the feeder on the line $x$ $x$, Fig. 1; Fig. 3, a section of the same on the line $y$ $y$.

A represents the feed-wheel, which, in the present instance, is of that common and well-known type which has a peripheral carrying rim or flange on one side. B represents the feed cup or case, made of about the usual form, adapted to fit upon the top and cover a portion of the hollow side of the wheel in such manner as to produce the usual grain channel or throat $a$, extending downward and backward within the wheel, and terminating at the rear edge of the case, where the grain escapes from the side of the wheel.

C represents my gate or regulating device, consisting of a block of suitable size hung in the hollow side of the wheel upon its shaft or axle, and arranged to swing downward into the delivery end or mouth of the seed channel or throat, in such manner as to reduce the size of the same and diminish the flow of grain. It will be noticed that the gate moves from the center of the wheel outward toward the rim, diminishing the grain-channel on its inner side, so that it does not interfere with or diminish the carrying-surface of the wheel or rim. It will also be noticed that the gate shown has its inner or under face curved eccentrically to its axis, the curvature being outward toward the rear end. When thus made, the gate gives the channel or throat a gradual contraction vertically as the delivery is approached, this form of channel being considered the best that can be used. The form of the gate may, however, be varied, if desired.

It will be noticed, on reference to Fig. 2, that the edge of the grain outlet or delivery and the inner edge of the gate stand in such relation or at such an angle to each other that the gate, in swinging forward, first enters the inner side of the outlet-opening, and closes the same gradually outward from that point, instead of at once closing the entire opening, as it would otherwise do.

The adjustment of the gate is secured, in the present instance, by providing it with a sector-rack, $b$, on its movable end, and arranging a pinion, $c$, to gear therein, the pinion being mounted on a rock-shaft, $d$, which has its end provided with an adjusting arm or lever, $e$, arranged to sweep over an index-plate, $f$. Any other suitable arrangement of devices may, however, be used to operate the gate—such, for instance, as a link connecting the gate with an arm on a rock-shaft, or a transversely-sliding rod or plate having inclined ribs or slots to act upon the gate.

The form of the wheel, case, and gate, or either of them, may be changed or modified, as desired, without departing from the limits of my invention, which consists, broadly, in hanging the feed-regulating gate of a force-feeding device upon the axis of the feed-wheel, or upon an axis concentric therewith.

It is manifest that the gate mounted as shown may be used with wheels having no side flange, with those consisting merely of a rim or ring, without the vertical disk, and with various well-known wheels which deliver from the periphery instead of from the side.

Having thus described my invention, what I claim is—

1. In a force-feed for grain drills or seeders, a feed-regulating gate hung upon or concentric with the axis of the feed-wheel, substantially as shown and described.

2. In combination with the cup or case B and flanged wheel A, the swinging feed-regulating gate C, mounted within the wheel, with its axis concentric with that of the wheel, and arranged to vary the capacity of the grain-channel, substantially as shown.

3. In a force-feed for grain-drills, a pivoted feed-regulating gate, pivoted upon or arranged to encircle the shaft of the feed-wheel, substantially as shown and described.

4. The feed-regulating gate, pivoted upon or around the feed-wheel shaft, and provided with the rack, in combination with the pinion, substantially as shown.

5. In a force-feed, the combination of a feed-wheel, a feed-cup in or against which the wheel is mounted and through which the grain is delivered, and a feed-regulating gate pivoted at a point within the periphery of the wheel and arranged to swing into the grain-outlet or delivery-opening from the outside, so as to diminish the size of the outlet, and thereby regulate the discharge of grain, substantially as shown and described.

6. In a force-feeding mechanism, the combination of a feed-wheel, a feed-regulating gate pivoted at a point within the periphery of the wheel, and a feed cup or case, into the mouth or delivery-opening of which the gate is arranged to close, the inner face of the gate and the edge of the delivery-opening being arranged at an angle to each other, so that as the gate swings inward it gradually diminishes the size of the outlet, substantially as shown and described.

JAMES F. WINCHELL.

Witnesses:
T. J. KIRKPATRICK,
J. B. CHRISTIE.